(12) United States Patent
Yuan et al.

(10) Patent No.: US 11,334,917 B2
(45) Date of Patent: May 17, 2022

(54) METHOD AND APPARATUS FOR DELIVERING ADVERTISEMENTS

(71) Applicant: ADVANCED NEW TECHNOLOGIES CO., LTD., Grand Cayman (KY)

(72) Inventors: Zheng Yuan, Shanghai (CN); Yi Lin, Shanghai (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 73 days.

(21) Appl. No.: 16/663,106

(22) Filed: Oct. 24, 2019

(65) Prior Publication Data

US 2020/0143419 A1    May 7, 2020

(30) Foreign Application Priority Data

Nov. 6, 2018    (CN) .......................... 201811315039.7

(51) Int. Cl.
*G06Q 30/02*        (2012.01)
(52) U.S. Cl.
CPC ..... *G06Q 30/0259* (2013.01); *G06Q 30/0277* (2013.01)
(58) Field of Classification Search
CPC .......................................... G06Q 30/02–0277
See application file for complete search history.

(56) References Cited

U.S. PATENT DOCUMENTS

| | | | |
|---|---|---|---|
| 8,983,488 B2 | 3/2015 | Sweeney et al. | |
| 9,049,259 B2 | 6/2015 | Rathod | |
| 9,159,034 B2 | 10/2015 | Pinckney et al. | |
| 9,230,263 B2 | 1/2016 | Tietzen et al. | |
| 9,396,471 B1 | 7/2016 | Kerr | |
| 9,720,555 B2 | 8/2017 | Sorden et al. | |
| 9,838,755 B1 * | 12/2017 | Kodige | ................ H04N 21/812 |
| 9,961,507 B1 | 5/2018 | Mendelson | |
| 9,998,881 B2 | 6/2018 | Hosier, Jr. | |

(Continued)

FOREIGN PATENT DOCUMENTS

| | | |
|---|---|---|
| AU | 2010308414 B1 | 8/2013 |
| CN | 206271036 U | 6/2017 |

(Continued)

OTHER PUBLICATIONS

Bala, "A Data Mining Model for Investigating the Impact of Promotion in Retailing" Mar. 1, 2009, 2009 IEEE International Advance Computing Conference, pp. 670-674. (Year: 2009).*

(Continued)

*Primary Examiner* — Raquel Alvarez

(57) ABSTRACT

Embodiments of the specification provide a method and apparatus for delivering advertisements. The method for delivering advertisements comprises: obtaining location information of a plurality of users and/or one or more offline merchants; determining a target group of target users around an advertisement delivery device according to the location information of a plurality of users and/or one or more offline merchants; determining profile data of the target group around the advertisement delivery device; and delivering an advertisement to the advertisement delivery device based on the profile data of the target group around the advertisement delivery device.

19 Claims, 4 Drawing Sheets

(56) References Cited

U.S. PATENT DOCUMENTS

| | | | |
|---|---|---|---|
| 10,546,326 B2 | 1/2020 | Publicover et al. | |
| 10,943,247 B1* | 3/2021 | Spector | G06Q 30/0222 |
| 2002/0091568 A1 | 7/2002 | Kraft et al. | |
| 2007/2700163 | 11/2007 | Anupam et al. | |
| 2009/0289956 A1* | 11/2009 | Douris | G01C 21/3602 |
| | | | 345/633 |
| 2009/0299857 A1 | 12/2009 | Brubaker | |
| 2011/0093335 A1 | 4/2011 | Fordyce, III et al. | |
| 2011/0238476 A1 | 9/2011 | Carr et al. | |
| 2012/0041825 A1* | 2/2012 | Kasargod | G06Q 30/02 |
| | | | 705/14.68 |
| 2012/0143678 A1* | 6/2012 | Sathyanath | G06Q 30/0251 |
| | | | 705/14.46 |
| 2013/0060623 A1* | 3/2013 | Walker | G06Q 30/0259 |
| | | | 705/14.27 |
| 2013/0138498 A1* | 5/2013 | Schwartz | G06Q 30/02 |
| | | | 705/14.35 |
| 2013/0204669 A1* | 8/2013 | Percy | G06F 16/9537 |
| | | | 705/7.34 |
| 2014/0114769 A1* | 4/2014 | Chaibi | G06Q 30/0269 |
| | | | 705/14.66 |
| 2014/0149221 A1* | 5/2014 | Rycyna, III | G06Q 30/0264 |
| | | | 705/14.61 |
| 2014/0379472 A1* | 12/2014 | Rao | G06F 8/00 |
| | | | 705/14.53 |
| 2016/0210660 A1 | 7/2016 | Flynn | |
| 2018/0033045 A1 | 2/2018 | Flynn | |

FOREIGN PATENT DOCUMENTS

| | | |
|---|---|---|
| CN | 107103483 A | 8/2017 |
| CN | 107134238 A | 9/2017 |
| CN | 107169808 A | 9/2017 |
| CN | 107679899 A | 2/2018 |
| CN | 108269128 A | 7/2018 |
| JP | 2006293610 A | 10/2006 |
| JP | 6402159 B2 | 10/2018 |
| KR | 101798827 B1 | 11/2017 |
| KR | 101891671 B1 | 8/2018 |
| TW | I286284 B | 9/2007 |
| TW | I554965 B | 10/2016 |
| WO | 2017065890 A1 | 4/2017 |

OTHER PUBLICATIONS

Written Opinion fo PCT Application No. PCT/US2019/057934 dated Sep. 4, 2020.
First Search for Chinese Application No. 201811315039.7 dated Mar. 29, 2020.
First Office Action for Chinese Application No. 201811315039.7 dated Apr. 7, 2020.
Second Office Action for Chinese Application No. 201811315039.7 dated May 12, 2020.
Supplementary Search for Chinese Application No. 201811315039.7 dated Jun. 28, 2020.
Search Report for Taiwanese Application No. 108123916 dated Apr. 30, 2020.
The International Search Report and Written Opinion of the International Searching Authority for International Application No. PCT/US2019/057934, dated Dec. 13, 2019, 14 pages.
International Preliminary Report on Patentability for PCT Application No. PCT/US2019/057934 dated Nov. 16, 2020.

* cited by examiner

METHOD AND APPARATUS FOR DELIVERING ADVERTISEMENTS

CROSS REFERENCE TO RELATED APPLICATION

The present application is based on and claims priority to Chinese Patent Application No. 201811315039.7, filed on Nov. 6, 2018, which is incorporated herein by reference in its entirety.

TECHNICAL FIELD

One or more embodiments of the specification relate to the field of computer technologies, particularly to a method and apparatus for delivering advertisements.

BACKGROUND ART

Traditional methods for delivering advertisements (e.g., outdoor advertisements) are not effective. For example, advertisements are delivered by placing pre-designed hardcopies (or other media) of advertisement content into outdoor windows. In another example, advertisements are delivered by displaying on electronic screens digital content pre-stored or pre-obtained through a network cloud. Therefore, more efficient and effective methods for delivering advertisements are needed.

SUMMARY

One or more embodiments of the specification describe a method and apparatus for delivering advertisements, which enable an advertisement delivery device to delivery targeted advertisements based on the characteristics of the user group around the advertisement delivery device, thereby improving advertisement delivery results.

In a first aspect, a method for delivering advertisements is provided. The method may comprise: obtaining location information of a plurality of users and/or one or more offline merchants; determining a target group of target users around an advertisement delivery device according to the location information of a plurality of users and/or one or more offline merchants; determining profile data of the target group around the advertisement delivery device; and delivering an advertisement to the advertisement delivery device based on the profile data of the target group around the advertisement delivery device.

In some embodiments, obtaining location information of a plurality of users and/or one or more offline merchants comprises: obtaining transaction information of one or more offline merchants, wherein the transaction information comprises locations of the one or more offline merchants and information of one or more buyers associated with the one or more offline merchants. In addition, determining a target group of target users around an advertisement delivery device according to the location information of a plurality of users and/or one or more offline merchants comprises: determining one or more target users around the advertisement delivery device according to the locations of the one or more offline merchants and the information of the one or more buyers associated with the one or more offline merchants, the one or more target users comprising one or more of the buyers associated with the one or more offline merchants.

In some embodiments, determining one or more target users around an advertisement delivery device according to the locations of the one or more offline merchants and the information of the one or more buyers associated with the one or more offline merchants comprises: calculating a distance between one of the one or more offline merchants and the advertisement delivery device based on the location of the offline merchant and a location of the advertisement delivery device; and in response to determining that the distance between the offline merchant and the advertisement delivery device is smaller than a threshold, determining that the one or more buyers associated with the offline merchant are one or more target users belonging to the target group around the advertisement delivery device.

In some embodiments, obtaining location information of a plurality of users and/or one or more offline merchants comprises: obtaining location based service (LBS) positioning information of the plurality of users. In addition, determining a target group of target users around an advertisement delivery device according to the location information of a plurality of users and/or one or more offline merchants comprises: determining one or more target users around the advertisement delivery device according to the location based service (LBS) positioning information of the plurality of users.

In some embodiments, determining one or more target users around the advertisement delivery device according to the location based service (LBS) positioning information of the plurality of users comprises: calculating a distance between one of the plurality of users and the advertisement delivery device based on the LBS positioning information of the user and a location of the advertisement delivery device; and in response to determining that the distance between the user and the advertisement delivery device is smaller than a threshold, determining that the user is a target user belonging to the target group around the advertisement delivery device.

In some embodiments, before determining profile data of the target group, the method further comprises: obtaining descriptive information of the target users in the target group. In addition, determining profile data of the target group comprises: determining profile data of the target group based on the descriptive information of the target users in the target group.

In some embodiments, delivering an advertisement to the advertisement delivery device based on the profile data of the target group around the advertisement delivery device comprises: determining tag information of the advertisement delivery device according to the profile data of the target group around the advertisement delivery device and the number of the target users in the target group; comparing the tag information of the advertisement delivery device with appeal information of the advertisement to determine whether the advertisement delivery device matches the advertisement; and in response to determining that the advertisement delivery device matches the advertisement, delivering the advertisement to the advertisement delivery device.

In some embodiments, determining tag information of the advertisement delivery device according to the profile data of the target group around the advertisement delivery device and the number of the target users in the target group comprises: determining user flow data associated with the advertisement delivery device based on the number of the target users in the target group within a preset time period; and determining the tag information of the advertisement delivery device based on the profile data of the target group and the determined user flow data.

In some embodiments, the method further comprise: delivering a plurality of advertisements to the advertisement delivery device by: ranking the plurality of advertisements; and delivering one or more of the plurality of advertisements to the advertisement delivery device based on the ranking.

In some embodiments, delivering an advertisement to the advertisement delivery device based on the profile data of the target group around the advertisement delivery device comprises: determining user flow data of the advertisement delivery device based on real-time sensing data collected by a sensing device associated with the advertisement delivery device; and delivering the advertisement to the advertisement delivery device based on the user flow data of advertisement delivery device and the profile data of the target group.

In some embodiments, the method further comprises: determining scene information associated with the advertisement delivery device according to the location information of the one or more offline merchants, wherein the scene information comprises descriptive information of an offline merchant around the advertisement delivery device. In addition, delivering an advertisement to the advertisement delivery device based on the profile data of the target group around the advertisement delivery device comprises: delivering an advertisement to the advertisement delivery device based on the profile data of the target group around the advertisement delivery device and the scene information associated with the advertisement delivery device.

In some embodiments, wherein determining scene information associated with the advertisement delivery device according to locations of the one or more offline merchants comprises: calculating a distance between one of the one or more offline merchants and the advertisement delivery device based on the location of the offline merchant and a location of the advertisement delivery device; and in response to determining that the distance between the offline merchant and the advertisement delivery device is smaller than a threshold, determining that the offline merchant is around the advertisement delivery device, and determining the scene information according to descriptive information of the offline merchant.

In some embodiments, the method further comprises: monitoring an effect of the advertisement delivered to the advertisement delivery device to generate a monitoring result; and sending the monitoring result to an advertiser associated with the advertisement.

In a second aspect, an apparatus for delivering advertisements is provided. The apparatus may comprise: one or more processors and one or more non-transitory computer-readable memories coupled to the one or more processors and configured with instructions executable by the one or more processors to cause the apparatus to perform operations comprising: obtaining location information of a plurality of users and/or one or more offline merchants; determining a target group of target users around an advertisement delivery device according to the location information of a plurality of users and/or one or more offline merchants; determining profile data of the target group around the advertisement delivery device; and delivering an advertisement to the advertisement delivery device based on the profile data of the target group around the advertisement delivery device.

In a third aspect, a non-transitory computer-readable storage medium is configured with instructions executable by one or more processors to cause the one or more processors to perform operations comprising: obtaining location information of a plurality of users and/or one or more offline merchants; determining a target group of target users around an advertisement delivery device according to the location information of a plurality of users and/or one or more offline merchants; determining profile data of the target group around the advertisement delivery device; and delivering an advertisement to the advertisement delivery device based on the profile data of the target group around the advertisement delivery device.

One or more embodiments of the specification provide a method and apparatus for delivering advertisements, for example, outdoor advertisements. The method may comprise: obtaining location information of a plurality of users and/or one or more offline merchants; determining a target group of target users around an advertisement delivery device according to the location information of a plurality of users and/or one or more offline merchants; determining profile data of the target group around the advertisement delivery device; and delivering an advertisement to the advertisement delivery device based on the profile data of the target group around the advertisement delivery device. The embodiments according to the specification may enable targeted delivery of an advertisement based on the characteristics and quantity of the group of users around an advertisement delivery device, thereby improving advertisement delivery results.

BRIEF DESCRIPTION OF THE DRAWINGS

In order to more clearly illustrate the embodiments of the specification, attached drawings will be described briefly below for description of the embodiments. The drawings in the following description illustrate some, but not all, embodiments of the specification. Those skilled in the art can obtain additional drawings based on these provided drawings without any creative effort.

DETAILED DESCRIPTION

Embodiments provided in the specification are described below with reference to the attached drawings.

Figure 1:
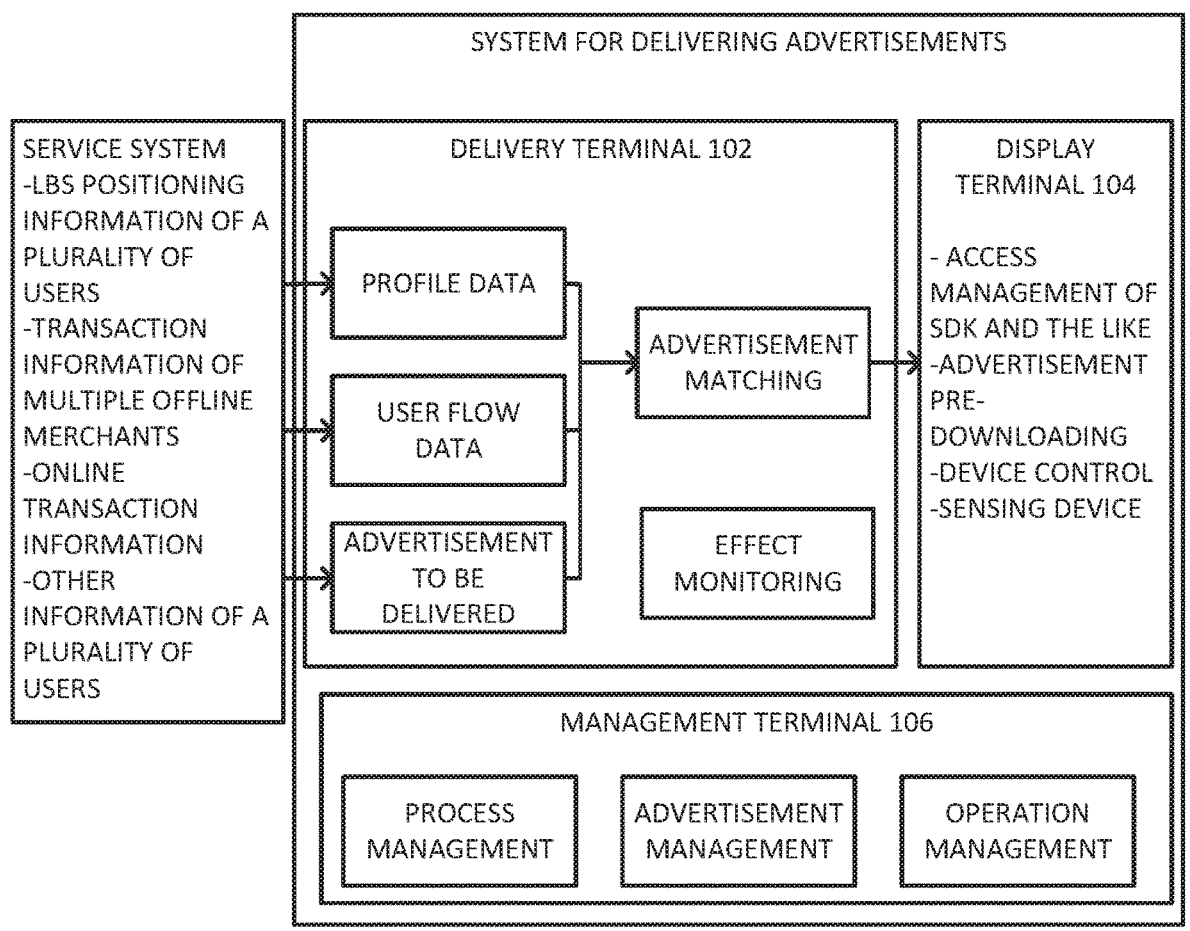
FIG. 1 is a schematic diagram of a system for delivering advertisements according to some embodiments of the specification.

A method and apparatus for delivering advertisements (e.g., outdoor advertisements) according to one or more embodiments of the specification may be implementable by a system for delivering outdoor advertisements as shown in FIG. 1. In FIG. 1, the system for delivering advertisements may comprise a delivery terminal 102 and a display terminal 104.

In some embodiments, the delivery terminal 102 may be configured to obtain information of a plurality of users, one or more offline merchants and one or more buyers associated with the one or more offline merchants. For example, the delivery terminal 102 is configured to read, from a transaction system, location based service (LBS) positioning information of multiple users and/or transaction information of transactions between multiple offline merchants and multiple buyers. An offline merchant may be a physical store as opposed to an online store. The transaction system may include, but is not limited to, a payment system (e.g., Alipay system, etc.), a credit system, and the like. Taking a payment system as an example, when a user opens a payment app on a terminal device, a backend server of the payment system may locate the user and collect LBS positioning information of the user. After collecting the LBS positioning information of the user, the user information, the LBS positioning information, obtaining time, and other information may be recorded in a storage unit of the terminal device. In addition, when a user conducts an offline transaction with an offline merchant that has activated a payment function based on the payment system, e.g., the user shops at a physical store, the payment system may collect transaction information of the transaction between the user and the offline merchant. For example, the transaction information may include at least a location of the offline merchant and may also include information of the user as a buyer. The transaction information may further include information such as a transaction time, and the like.

In some embodiments, the delivery terminal 102 may access various online or offline data sources of the transaction system to collect the LBS positioning information of the users and the transaction information of transactions between the offline merchants and buyers. That is, not only online transaction information of the transaction system but also offline transaction information of the transaction system can be obtained.

After obtaining the multiple users' LBS positioning information and/or the offline merchants' transaction information, the delivery terminal 102 may determine target groups each around an advertisement delivery device with a known location based on the obtained information. For example, a target group may be a set of target users determined from the multiple users whose LBS positioning information has been obtained and from the buyers associated with the multiple offline merchants whose transaction information has been obtained. That is, target users in the target group may include some of the users whose LBS positioning information has been obtained and/or some of the buyers associated with the offline merchants whose transaction information has been obtained. Subsequently, descriptive information of these target groups may be obtained from the transaction system. The descriptive information of a target group may include, but is not limited to, ages, genders, occupations, hobbies, and the like, of the set of target users in the target group. Based on the obtained descriptive information of the target group, profile data of the target group may be determined. For example, the target group may be determined as a digital group, an elderly group, and a maternal and infant group, etc. In addition, the number of target users in the target group may further be counted. User flow data of each advertisement delivery device is calculated based on the number of target users in the target group and a preset time period. Furthermore, tag information of each advertisement delivery device is determined according to the profile data of the target group around the advertisement delivery device and the user flow data of the advertisement delivery device. In some embodiments, the tag information may be determined by combining scene information (such as information of the offline merchant, etc.) around the advertisement delivery device with the profile data and the user flow data.

After the tag information of each advertisement delivery device has been determined, the tag information may be matched with appeal information of an advertisement to be delivered to select a target delivery device that matches an advertisement to be delivered from a plurality of advertisement delivery devices. Alternatively, the tag information of an advertisement device may be compared with appeal information of multiple advertisements to be delivered to determine an advertisement having appeal information that matches the tag information of the advertisement device. In still another example, the tag information of an advertisement delivery device may be compared with appeal information of the advertisement to be delivered to determine whether the advertisement delivery device matches the advertisement; and in response to that the advertisement delivery device matches the advertisement, the advertisement may be delivered to the advertisement delivery device for display.

The display terminal 104 is the foregoing advertisement delivery device, which is configured to download matching creative materials of advertisements to be delivered from the delivery terminal 102 and play the advertisements. In addition, the display terminal 104 may be equipped with a camera or other sensing devices such as an iBeacon and the like. Through the sensing devices, activity information of a surrounding group of users may be perceived (for example, opening a payment app or paying through a payment app, etc.), and user flow data and other indicators such as a proportion of users with the same characteristics and the like may be obtained.

The foregoing display terminal 104 may be further configured to have functions such as software development kit (SDK) access management, advertisement pre-downloading, device availability control and the like.

After an advertisement is displayed or delivered on the display terminal 104, the delivery terminal 102 may further monitor a delivery effect of the advertisement. For example, a time duration of attention of a group of users around the advertisement and the like may be monitored. Monitoring results may then be sent back to an advertiser associated with the advertisement.

In addition, the system for delivering advertisements (e.g., outdoor advertisements) as described above may further comprise a management terminal 106. The management terminal 106 is configured for process management, advertisement management and operation management. The process management may include, but is not limited to, device management, device protection, and management related to exposure values and post-link benefit distribution and the like. The advertisement management may include, but is not limited to, inventory estimation, summarization of monitoring reports and the like. The operation management may include, but is not limited to, device availability control, matching policy intervention, compliance control and the like.

Figure 2:
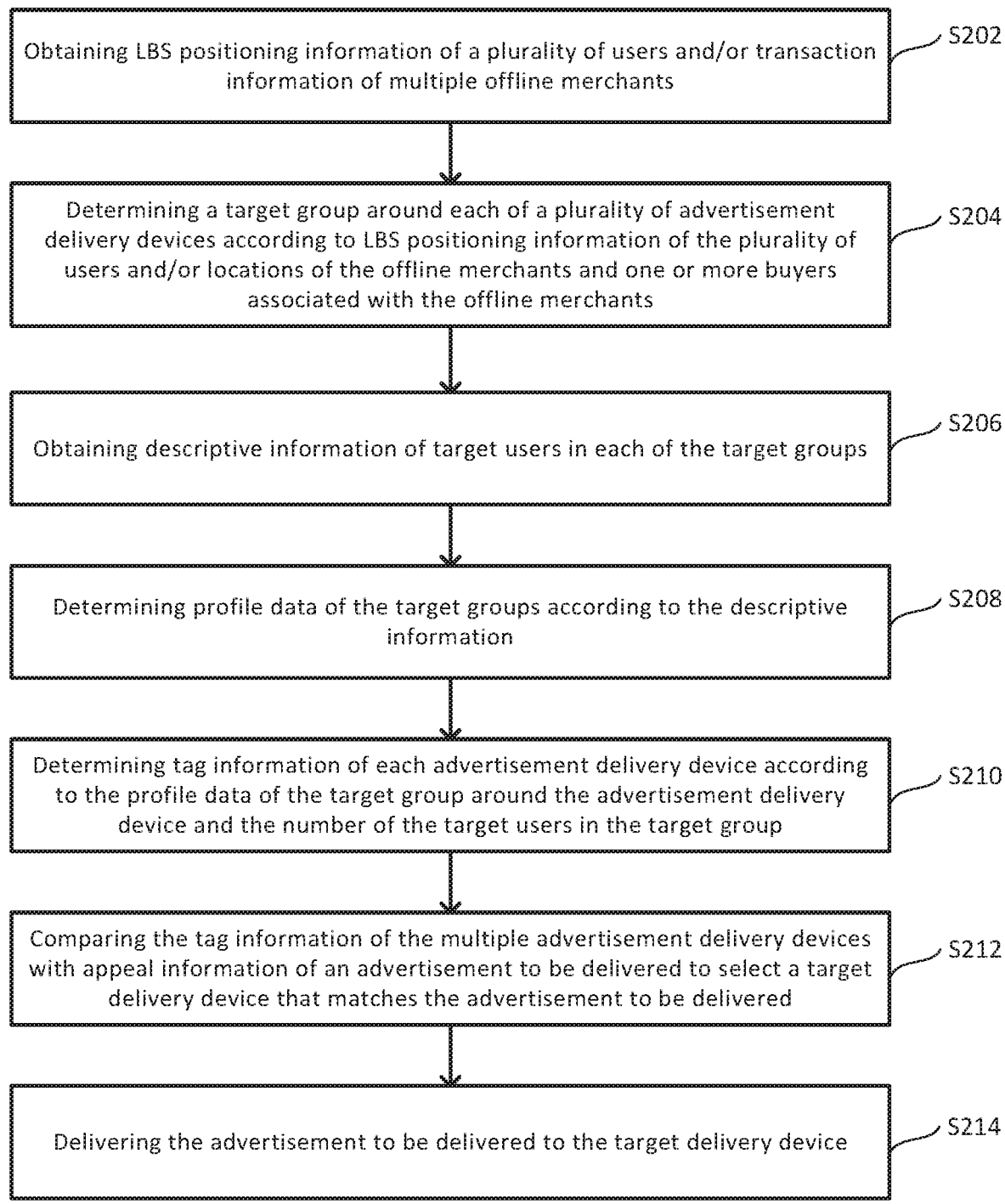
FIG. 2 is a flow chart of a method for delivering advertisements according to some embodiments of the specification.

FIG. 2 is a flow chart of a method for delivering advertisements according to some embodiments of the specification. The method may be executed by a device with a processing capability: a server, a system or a device. For example, the device may be the delivery terminal 102 in FIG. 1. As shown in FIG. 2, the method may comprise steps 202-214.

Step 202: obtaining location based service (LB S) positioning information of a plurality of users and/or transaction information of multiple offline merchants.

In some embodiments, location based service (LBS) positioning information of the plurality of users and/or transaction information of the one or more offline merchants may be obtained, wherein the transaction information includes locations of the one or more offline merchants and information of the one or more buyers associated with the one or more offline merchants. For example, the above LBS positioning information and/or transaction information may be obtained from a transaction system. The transaction system may include, but is not limited to, a payment system (e.g., Alipay system, etc.), a credit system, and the like. Taking a payment system as an example, when a user opens a payment app on a terminal device, a backend server of the payment system may locate the user and collect LBS positioning information of the user. After collecting the LBS positioning information of the user, the user information, the LBS positioning information, obtaining time, and other information may be recorded in a storage unit of the terminal device. In addition, when a user conducts an offline transaction with an offline merchant that has activated a payment function based on the payment system, the payment system may collect transaction information of the transaction between the offline merchant and the user. For example, the transaction information may include at least a location of the offline merchant and may also include information of the user as a buyer. The transaction information may further include information such as a transaction time, and the like.

In some embodiments, LBS positioning information of the multiple users and/or transaction information of multiple offline merchants over a past period of time (e.g., the past two minutes or the past day, etc.) may be obtained from the transaction system according to a collection time and/or the foregoing transaction time. In other embodiments, all of the LBS positioning information of the users and/or transaction information of the offline merchants in the past may be obtained.

Step 204: determining a target group around each of a plurality of advertisement delivery devices according to LBS positioning information of the plurality of users and/or locations of the offline merchants and one or more buyers associated with the offline merchants.

The advertisement delivery device may include, but is not limited to, an electronic screen and the like. In some embodiments, the location of each advertisement delivery device is known or pre-determined. A process for determining the foregoing target groups may include the following steps. With respect to LBS positioning information, a distance between any user and each advertisement delivery device may be calculated based on LBS positioning information of this user and a known location of each advertisement delivery device. When the distance of the user from an advertisement delivery device is smaller than a preset threshold, this user is a target user belonging to a target group of the advertisement delivery device. The distance for each user is calculated and compared with the threshold until the determination has been performed for all users. With respect to transaction information, a distance between an offline merchant and each advertisement delivery device may be calculated based on the location of the offline merchant and a known location of each advertisement delivery device. When the distance of the offline merchant from an advertisement delivery device is smaller than a preset threshold, any buyer of the offline merchant indicated in the transaction information may be determined to be a target user belonging to a target group of the advertisement delivery device. Similarly, the above process with respect to the transaction information may be repeated until the determination has been performed for all pieces of the transaction information.

Step 206: obtaining descriptive information of target users in each of the target groups.

For example, descriptive information of each target user in a target group may be obtained from the transaction system. The descriptive information may refer to information describing an identity or characteristic of a user, such as an age, a gender, an occupation, hobbies and the like.

Step 208: determining profile data of the target groups according to the descriptive information.

The profile data of a target group may refer to characteristics of the target users in the target group. For example, the profile data may include, but is not limited to, a digital group, an elderly group, a maternal and infant group and the like. A digital group may indicate that the target users in the group are interested in digital products. Similarly, an elderly group may indicate that the target users in the group are elders. A maternal and infant group may indicate that the target users in the group are mothers, pregnant women, or other people interested in maternity and infant products.

The above profile data may be determined by criteria. For example, a group of people aged 20 to 40 who are active during rush hours may be determined as a digital group; and a group of people aged 60 to 70 who are active in the early morning may be determined as an elderly group; and so on. Other criteria may be applied. For example, the criteria may include more limitations, such as an activity place and the like.

Step 210: determining tag information of each advertisement delivery device according to the profile data of the target group around the advertisement delivery device and the number of the target users in the target group.

The tag information of each advertisement delivery device may indicate features or characteristics of the advertisement delivery device. For example, the tag information may include at least two dimensions of information: first, profile data of a surrounding target group; and second, the number of the target users in the surrounding target group.

In some embodiments, when data in a past period of time is obtained in step 202, user flow data of each advertisement delivery device may be determined according to the number of the target users in the target group surrounding the advertisement delivery device and the length of the period of time. Then, the tag information of each advertisement delivery device is determined based on the profile data and user flow data. In some embodiments, the user flow data herein may be perceived by a sensing device (to be subsequently described).

In some embodiments, in order to deliver an advertisement more effectively, scene information of each advertisement delivery device may further be determined according to locations of offline merchants included in the transaction information. The scene information may refer to descriptive information of a surrounding offline merchant, such as a restaurant A, a movie theater B, a shopping mall C and the like in the surrounding area of the advertisement delivery device. Then, the tag information of each advertisement delivery device is determined based on the profile data, and the user flow data and the scene information associated with the advertisement delivery device. That is, the tag information may include three dimensions of information: the profile data of the surrounding target group, the user flow data and scene information associated with the advertisement delivery device.

In addition, when the foregoing profile data is characteristics of a proportion of the target users in the target group, the proportion may be calculated and used as a part of the foregoing tag information.

Step 212: comparing the tag information of the multiple advertisement delivery devices with appeal information of an advertisement to be delivered to select a target delivery device that matches the advertisement to be delivered.

For example, assuming that there are three advertisement delivery devices: device A, device B and device C, corresponding tag information is shown in Table 1.

TABLE 1

| Advertisement delivery device | Tag information | |
|---|---|---|
| | Profile data | User flow data |
| Device A | Digital group | 1,000 persons/minute |
| Device B | Digital group | 200 persons/minute |
| Device C | Maternal and infant group | 300 persons/minute |

The contents of Table 1 are examples and the tag information according to the embodiments of the specification is not limited to that in Table 1. For example, Table 1 may further include scene information and the like.

For example, if appeal information of an advertisement to be delivered is as follows: a digital group and user flow data greater than 500 persons/minute, then the device A may be selected to be the target advertisement delivery device because the tag information of the device A matches the appeal information of the advertisement. In other examples, the appeal information of an advertisement to be delivered may include other information in various aspects. In some embodiments, tag information of each advertisement delivery device and appeal information of an advertisement to be delivered may be matched by a matching algorithm. Then, a target delivery device that matches an advertisement to be delivered is selected based on matching results.

In some embodiments, multiple advertisements to be delivered may be matched with an advertisement delivery device, the multiple matched advertisements to be delivered may be sorted or ranked. For example, sorting or ranking may be performed according to degrees of matching between the multiple advertisements and the advertisement delivery device. In another example, sorting or ranking may be performed according to priorities of the multiple advertisements.

Step 214: delivering the advertisement to be delivered to the target delivery device.

The target delivery device (e.g., the display terminal 104) may download creative materials of the advertisement to be delivered from a delivery terminal 102 and play the creative materials of the advertisement to be delivered. When there are multiple advertisements to be delivered, the advertisements to be delivered may be delivered in turn. In addition, the target delivery device may further be equipped with a camera or other sensing devices such as an iBeacon and the like. Through the sensing devices, activity information of a surrounding group of users may be perceived (for example, opening a payment app or paying through a payment app, etc.), and user flow data and other indicators such as the foregoing proportion of users and the like may be obtained.

The foregoing target delivery device may be further configured to have functions such as SDK access management, advertisement pre-downloading, device availability control and the like.

After the advertisement is delivered, its delivery effect may be monitored. For example, a time duration of attention of a group of users around the advertisement and the like may be monitored. Monitoring results may then be fed back to an advertiser associated with the advertisement.

In addition, the embodiments of the specification may further perform process management, advertisement management, operation management and the like. The process management may include, but is not limited to, device management, device protection, and management related to exposure values and post-link benefit distribution and the like. The advertisement management may include, but is not limited to, inventory estimation, summarization of monitoring reports and the like. The operation management may include, but is not limited to, device availability control, matching policy intervention, compliance control and the like.

In summary, the method for delivering advertisements (e.g., outdoor advertisements) according to the embodiments of the specification enables targeted deliveries of advertisements based on advertisement audiences, thereby improving delivery effectiveness. In addition, after an advertisement is delivered, its delivery effect may be monitored. The monitoring results may be fed back to the advertiser to enhance the advertiser's delivery experience. Furthermore, the advertisement delivery process may be managed, thereby improving the efficiency of advertisement management.

In some embodiments, the payment in one or more embodiments of the specification may be supported by technologies such as Near Field Communication (NFC), WIFI, 3G/4G/5G, POS machine card swiping technology, QR code scanning technology, barcode scanning technology, Bluetooth, infrared technology, Short Message Service (SMS), Multimedia Message Service (MMS) and the like.

Figure 3:
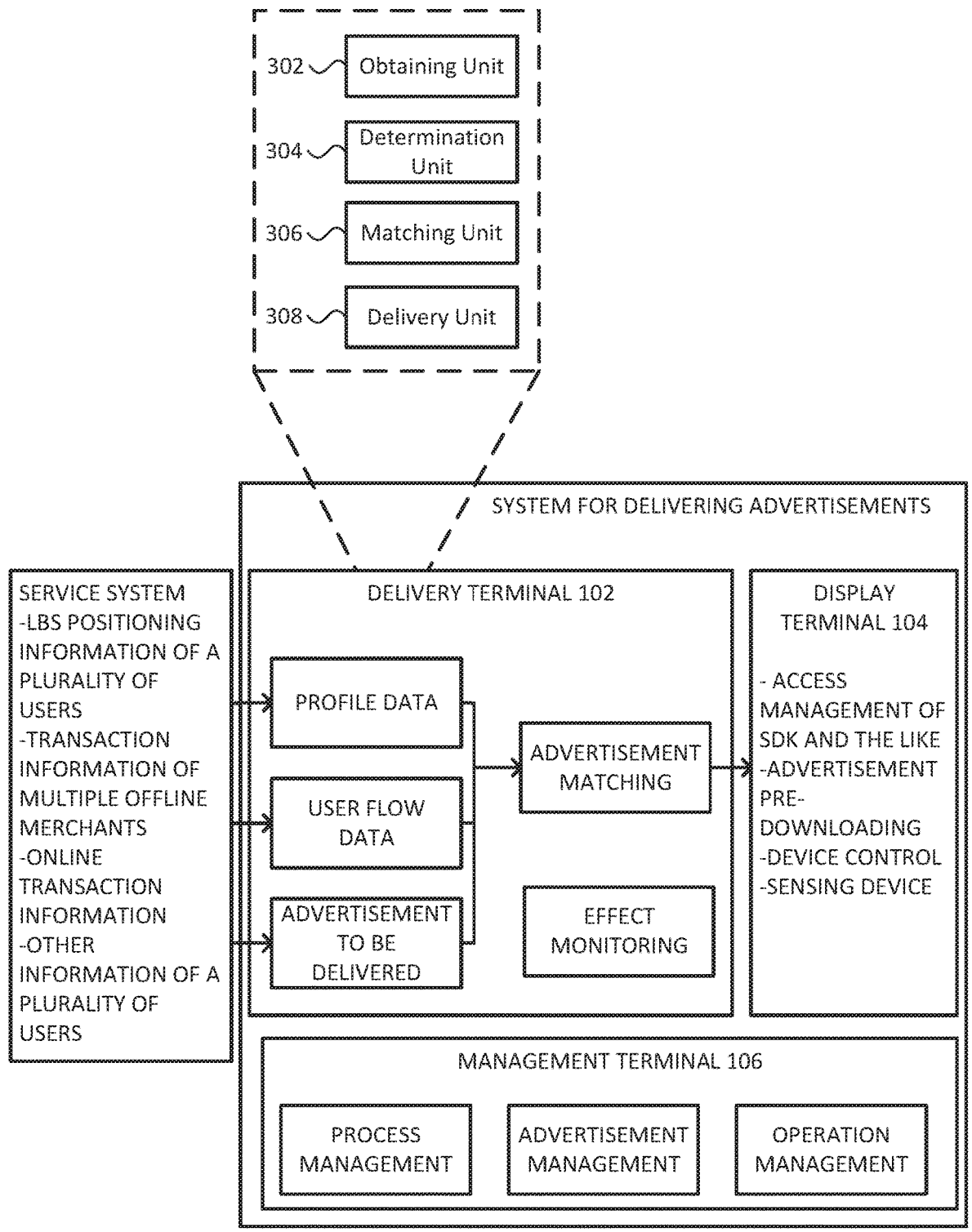
FIG. 3 is a schematic diagram of an apparatus for delivering advertisements according to some embodiments of the specification.

Corresponding to the method for delivering advertisements described above, some embodiments of the specification further provide an apparatus for delivering advertisements, as shown in FIG. 3. The apparatus may comprise: an obtaining unit 302 configured to obtain location based service (LBS) positioning information of a plurality of users and/or transaction information of one or more offline merchants, wherein the transaction information includes locations of the one or more offline merchants and information of one or more buyers associated with the one or more offline merchants; and a determination unit 304 configured to determine a target group around each of a plurality of advertisement delivery devices according to the LBS positioning information of the plurality of users and/or the locations of the one or more offline merchants and the information of one or more buyers associated with the one or more offline merchants obtained by the obtaining unit 302.

In some embodiments, the determination unit 304 may be configured to: calculate a distance between an offline merchant and each of the plurality of advertisement delivery devices based on the location of the offline merchant and a location of the each of the plurality of advertisement delivery devices; and when the distance of the offline merchant from the advertisement delivery device is smaller than a preset threshold, determine that the one or more buyers associated with the offline merchant belong to the target group around the advertisement delivery device.

In some embodiments, the obtaining unit 302 may be further configured to obtain descriptive information of target users in the target group; and the determination unit 304 may be further configured to determine profile data of the target group according to the descriptive information of the target users in the target group obtained by the obtaining unit 302.

In some embodiments, the determination unit 304 may be further configured to determine tag information of each of the plurality of advertisement delivery devices according to the profile data of the target group around the advertisement delivery device and the number of the target users in the target group. The apparatus may further comprise a matching unit 306 configured to compare the tag information of the each of the plurality of advertisement delivery devices with appeal information of the advertisement to determine a target delivery device that matches the advertisement from the plurality of advertisement delivery devices; and a delivery unit 308 configured to deliver the advertisement to be delivered to the target delivery device selected by the matching unit 306.

In some embodiments, the determination unit 304 may be configured to: determine user flow data associated with the each of the plurality of advertisement delivery devices based on the number of the target users in the target group within a preset time period; and determining the tag information of the each of the plurality of advertisement delivery device based on the profile data of the target group and the determined user flow data.

In some embodiments, the determination unit 304 may further be configured to: determine scene information associated with each of the plurality of advertisement delivery devices according to the locations of the one or more offline merchants; and determine the tag information of each advertisement delivery device according to the profile data, the user flow data and the scene information.

In some embodiments, the apparatus may further comprise: a monitoring unit 310 configured to monitor a delivery effect of the delivered advertisement to obtain monitoring results; and a feedback unit 312 configured to send the monitoring results obtained by the monitoring unit 310 to an advertiser associated with the delivered advertisement.

Functions of each functional module of the apparatus as described in the foregoing embodiments of the specification may be implemented according to the foregoing method embodiments. Therefore, the detailed working processes of the apparatus will not be elaborated herein.

In summary, the embodiments of the specification provide an apparatus for delivering advertisements, in which an obtaining unit 302 obtains location based service (LBS) positioning information of a plurality of users and/or transaction information of one or more offline merchants; a determination unit 304 determines a target group around each of a plurality of advertisement delivery devices according to the LBS positioning information of the plurality of users and/or locations of the one or more offline merchants and information of the one or more buyers associated with the one or more offline merchants included by the transaction information; the obtaining unit 302 obtains descriptive information of target users in the target group; the determination unit 304 determines profile data of the target group according to the descriptive information; the determination unit 304 determines tag information of each advertisement delivery device according to the profile data of the target group around the advertisement delivery device and the number of the target users in the target group; a matching unit 306 compares the tag information with appeal information of an advertisement to be delivered to select a target delivery device that matches the advertisement to be delivered; and a delivery unit 308 delivers the advertisement to be delivered to the target delivery device. Therefore, a targeted delivery can be performed according to characteristics of the advertisement audiences, thereby improving delivery effectiveness.

In some embodiments, the apparatus for delivering advertisements may be a module or a unit of the delivery terminal 102 in FIG. 1.

Figure 4:
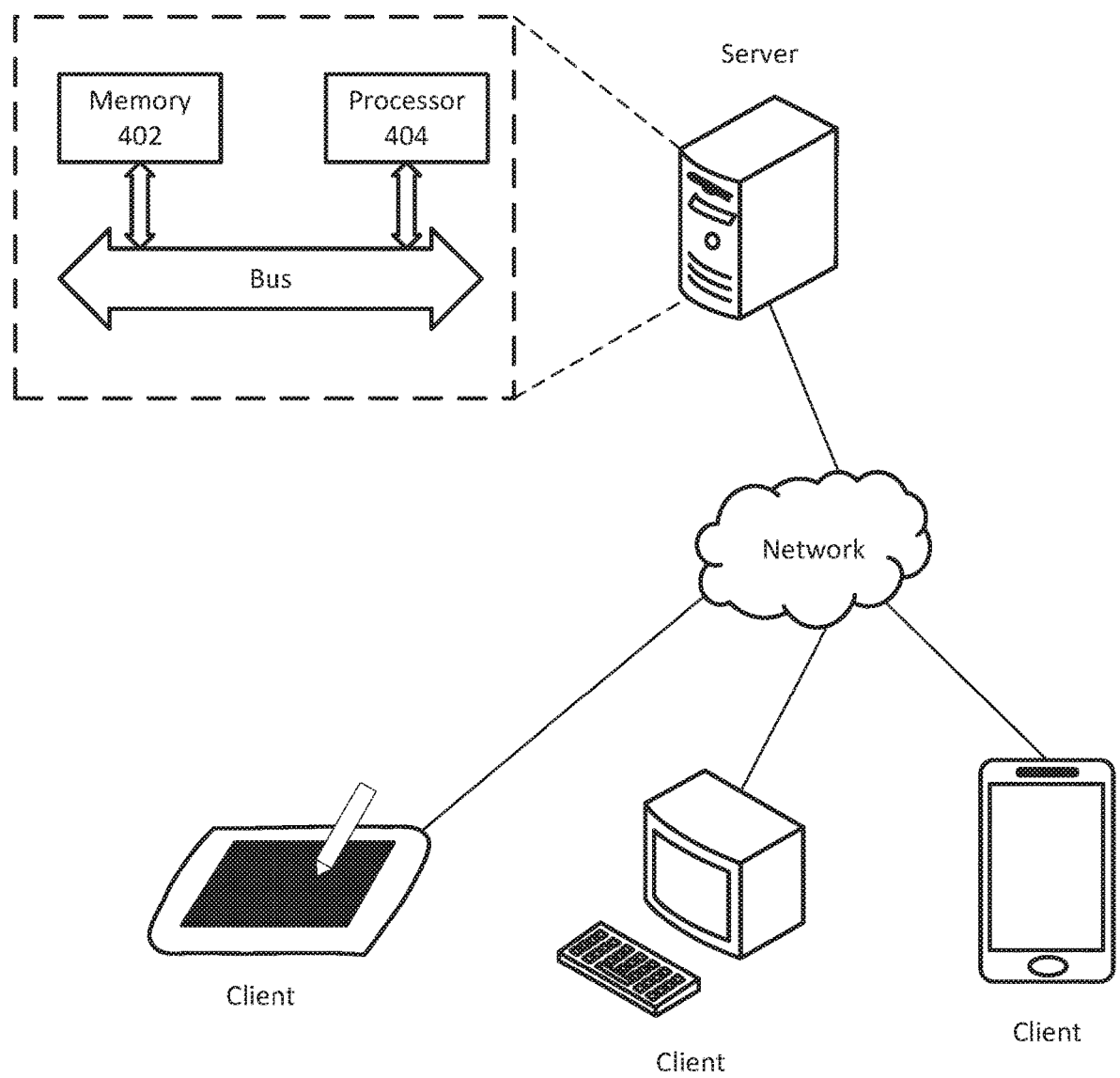
FIG. 4 is a schematic diagram of an apparatus for delivering advertisements according to other embodiments of the specification.

Similar to the method for delivering advertisements described above, the specification further provides an apparatus for delivering advertisements according to other embodiments, as shown in FIG. 4. The apparatus may comprise: a memory 402, one or more processors 404, and one or more programs. The one or more programs may be stored in the memory 402 and configured to be executable by the one or more processors 404. The one or more programs, when executed by the one or more processors 404, implement the following steps: obtaining location based service (LBS) positioning information a plurality of users and/or transaction information of one or more offline merchants, wherein the transaction information includes locations of the one or more offline merchants and information of one or more buyers associated with the one or more offline merchants; determining a target group around each of a plurality of advertisement delivery devices according to the LBS positioning information of the plurality of users and/or the locations of the one or more offline merchants and information of the one or more buyers associated with the one or more offline merchants; obtaining descriptive information of the target group; determining profile data of the target group according to the descriptive information; determining tag information of each advertisement delivery device according to the profile data of the target group around the advertisement delivery device and the number of target users in the target group; comparing the tag information with appeal information of an advertisement to be delivered to select a target delivery device that matches the advertisement to be delivered; and delivering the advertisement to be delivered to the target delivery device.

The apparatus for delivering advertisements according to the embodiments of the specification can perform a targeted delivery according to characteristics of the advertisement audience, thereby improving delivery effectiveness.

The embodiments of the specification are described in a progressive manner, the same or similar parts among the embodiments may be referred to mutually, and each embodiment focuses on differences from other embodiments. For example, since the apparatus embodiments are similar to the method embodiments, the description of the method embodiments may be referred to for relevant parts in the apparatus embodiments.

The steps of the methods or the algorithms described in combination with the disclosure of the specification may be implemented by hardware or by a processor via executing software instructions. Software instructions may include corresponding software modules that may be stored in a random access memory (RAM), a flash memory, a read-only memory (ROM), an erasable programmable read-only memory (EPROM), an electrically erasable programmable read only memory (EEPROM), a register, a hard disk, a removable hard disk, a compact disc-read only memory (CD-ROM), or any other form of storage medium known in the art. A storage medium is coupled to a processor, thereby enabling the processor to read information from and write information to the storage medium. A storage medium may also be an integral part of a processor. The processor and the storage medium may be located in an application-specific integrated circuit (ASIC). Additionally, the ASIC may be located in a server. The processor and the storage medium may also exist as discrete components in a server.

Those skilled in the art should appreciate that in one or more examples as described above, functions described in the specification may be implemented by hardware, software, firmware or any combination thereof. In case of implementation by software, the functions may be stored in a computer readable medium or transmitted as one or more instructions or codes on a computer readable medium. A computer readable medium includes a computer storage medium and a communication medium, wherein the communication medium includes any medium that facilitates transfer of computer programs from one location to another. A storage medium may be any available medium that may be accessed by a general purpose computer or a special purpose computer.

Embodiments of the specification have been described above. Other embodiments are within the scope of the attached claims. In some embodiments, actions or steps described in the claims may be performed in an order different from that in the embodiments and may still achieve desired results. In addition, the processes depicted in the attached drawings are not required to be in a particular order or in a consecutive order to achieve desired results. In some embodiments, multitasking and parallel processing are also possible or may be advantageous.

The specification further provides in detail the objectives and beneficial effects of the embodiments. It should be understood that the above description is examples of the specification and is not intended to limit the protection scope of the specification. Any modification, equivalent substitution, improvement and the like made on the basis of the embodiments of the specification is intended to be included in the protection scope of the specification.

What is claimed is:

1. A computer-implemented method for delivering advertisements, comprising:
    collecting, by a payment system, location information of a plurality of users from terminal devices of the plurality of users;
    activating, by the payment system, a payment function in the payment system for one or more offline merchants;
    collecting, by the payment system, transaction information of one or more offline transactions between the one or more offline merchants and one or more buyers;
    obtaining, by a delivery terminal from the payment system, the location information of the plurality of users;
    obtaining, by the delivery terminal from the payment system, the transaction information;
    determining, by the delivery terminal, a target group of target users around an advertisement delivery device according to the location information of the plurality of users, a location of the advertisement delivery device, and the transaction information of the one or more offline merchants;
    determining, by the delivery terminal, profile data of the target group around the advertisement delivery device;
    collecting, by the advertisement delivery device, real-time sensing data using one or more sensing devices of the advertisement delivery device, wherein the one or more sensing devices include an iBeacon device;
    determining, by the delivery terminal, user flow data of the advertisement delivery device based on the real-time sensing data collected by the one or more sensing devices, the real-time sensing data comprising a number of times the target users interact with the iBeacon device using iBeacon technology; and
    delivering, by the delivery terminal to the advertisement delivery device, an advertisement based on the user flow data of the advertisement delivery device and the profile data of the target group around the advertisement delivery device.

2. The computer-implemented method of claim 1, wherein obtaining, by the delivery terminal from the payment system, the transaction information of the one or more offline merchants comprises:
    obtaining, by the delivery terminal from the payment system, the transaction information of one or more offline merchants, wherein the transaction information comprises one or more locations of the one or more offline merchants and information of one or more buyers associated with the one or more offline merchants; and
    wherein determining, by the delivery terminal, the target group of target users around the advertisement delivery device comprises:
    determining, by the delivery terminal, one or more target users around the advertisement delivery device according to the one or more locations of the one or more offline merchants and the information of the one or more buyers associated with the one or more offline merchants, the one or more target users comprising one or more of the buyers associated with the one or more offline merchants.

3. The computer-implemented method of claim 2, wherein determining, by the delivery terminal, the one or more target users around an advertisement delivery device according to the locations of the one or more offline merchants and the information of the one or more buyers associated with the one or more offline merchants comprises:
    calculating, by the delivery terminal, a distance between one of the one or more offline merchants and the advertisement delivery device based on the location of the offline merchant and the location of the advertisement delivery device; and
    in response to determining that the distance between the offline merchant and the advertisement delivery device is smaller than a threshold, determining, by the delivery terminal, that the one or more buyers associated with the offline merchant are one or more target users belonging to the target group around the advertisement delivery device.

4. The computer-implemented method of claim 1, wherein obtaining, by the delivery terminal from the payment system, the location information of the plurality of users comprises:
    obtaining, by the delivery terminal from the payment system, location based service (LBS) positioning information of the plurality of users; and
    wherein determining, by the delivery terminal, the target group of target users around the advertisement delivery device comprises:
    determining, by the delivery terminal, one or more target users around the advertisement delivery device according to the location based service (LBS) positioning information of the plurality of users.

5. The computer-implemented method of claim 4, wherein determining, by the delivery terminal, the one or more target users around the advertisement delivery device according to the location based service (LBS) positioning information of the plurality of users comprises:
    calculating, by the delivery terminal, a distance between one of the plurality of users and the advertisement delivery device based on the LBS positioning information of the user and a location of the advertisement delivery device; and
    in response to determining that the distance between the user and the advertisement delivery device is smaller than a threshold, determining, by the delivery terminal, that the user is a target user belonging to the target group around the advertisement delivery device.

6. The computer-implemented method of claim 1, before determining profile data of the target group, the method further comprises:

obtaining, by the delivery terminal from the payment system, descriptive information of the target users in the target group; and wherein determining, by the delivery terminal, profile data of the target group comprises:

determining, by the delivery terminal, profile data of the target group based on the descriptive information of the target users in the target group.

7. The computer-implemented method of claim 1, wherein delivering, by the delivery terminal to the advertisement delivery device, the advertisement based on the user flow data of the advertisement delivery device and the profile data of the target group around the advertisement delivery device comprises:

determining, by the delivery terminal, tag information of the advertisement delivery device according to the profile data of the target group around the advertisement delivery device and the number of the target users in the target group;

comparing, by the delivery terminal, the tag information of the advertisement delivery device with appeal information of the advertisement to determine whether the advertisement delivery device matches the advertisement; and in response to determining that the advertisement delivery device matches the advertisement, delivering, by the delivery terminal to the advertisement delivery device, the advertisement.

8. The computer-implemented method of claim 7, wherein determining, by the delivery terminal, the tag information of the advertisement delivery device according to the profile data of the target group around the advertisement delivery device and the number of the target users in the target group comprises:

determining, by the delivery terminal, the user flow data associated with the advertisement delivery device based on a number of the target users in the target group within a preset time period; and determining, by the delivery terminal, the tag information of the advertisement delivery device based on the profile data of the target group and the user flow data.

9. The computer-implemented method of claim 1, further comprising:

delivering, by the delivery terminal to the advertisement delivery device, a plurality of advertisements by:

ranking the plurality of advertisements; and delivering one or more of the plurality of advertisements to the advertisement delivery device based on the ranking.

10. The computer-implemented method of claim 1, further comprising:

determining, by the delivery terminal, scene information associated with the advertisement delivery device according to the location information of the one or more offline merchants, wherein the scene information comprises descriptive information of an offline merchant around the advertisement delivery device; and wherein delivering, by the delivery terminal to the advertisement delivery device, the advertisement comprises:

delivering, by the delivery terminal to the advertisement delivery device, the advertisement to the advertisement delivery device based on the user flow data of the advertisement delivery device, the profile data of the target group around the advertisement delivery device and the scene information associated with the advertisement delivery device.

11. The computer-implemented method of claim 10, wherein determining, by the delivery terminal, the scene information associated with the advertisement delivery device according to locations of the one or more offline merchants comprises:

calculating, by the delivery terminal, a distance between one of the one or more offline merchants and the advertisement delivery device based on the location of the offline merchant and a location of the advertisement delivery device; and in response to determining that the distance between the offline merchant and the advertisement delivery device is smaller than a threshold, determining, by the delivery terminal, that the offline merchant is around the advertisement delivery device, and determining, by the delivery terminal, the scene information according to descriptive information of the offline merchant.

12. The computer-implemented method of claim 1, further comprising:

displaying, by the advertisement delivery device, the advertisement delivered by the delivery terminal;

monitoring, by the delivery terminal, an effect of the advertisement delivered to the advertisement delivery device to generate a monitoring result; and sending, by the delivery terminal, the monitoring result to an advertiser associated with the advertisement.

13. An apparatus for delivering advertisement, comprising:

a payment system comprising: (i) one or more payment system processors and (ii) one or more payment system memories storing first computer-readable instructions that, when executed by the one or more payment system processors, cause the one or more payment system processors to perform operations comprising:

collecting location information of a plurality of users from terminal devices of the plurality of users;

activating, by the payment system, a payment function in the payment system for one or more offline merchants; and collecting transaction information of one or more offline transactions between the one or more offline merchants and one or more buyers;

an advertisement delivery device, comprising: (i) one or more advertisement delivery device processors and (ii) one or more advertisement delivery device memories storing second computer-readable instructions that, when executed by the one or more advertisement delivery device processors, cause the one or more advertisement delivery device processors to perform operations comprising:

collecting real-time sensing data using one or more sensing devices of the advertisement delivery device, wherein the one or more sensing devices include an iBeacon device; and a delivery terminal comprising (i) one or more delivery terminal processors and (ii) one or more delivery terminal memories storing third computer-readable instructions that, when executed by the one or more delivery terminal processors, cause the one or more delivery terminal processors to perform operations comprising:

obtaining, from the payment system, the location information of a plurality of users;

obtaining, from the payment system, the transaction information;

determining a target group of target users around the advertisement delivery device according to the location information of the plurality of users, a location of the advertisement delivery device, and the transaction information of the one or more offline merchants;

determining profile data of the target group around the advertisement delivery device;

determining user flow data of the advertisement delivery device based on the real-time sensing data collected by the one or more sensing devices of the advertisement delivery device, the real-time sensing data comprising a number of times the target users interact with the iBeacon device using iBeacon technology; and delivering an advertisement to the advertisement delivery device based on the user flow data of the advertisement delivery device and the profile data of the target group around the advertisement delivery device.

14. The apparatus of claim 13, wherein obtaining, from the payment system, the transaction information of the one or more offline merchants comprises:

obtaining, from the payment system, the transaction information of one or more offline merchants, wherein the transaction information comprises one or more locations of the one or more offline merchants and information of one or more buyers associated with the one or more offline merchants; and wherein determining the target group of target users around an advertisement delivery device comprises:

determining one or more target users around the advertisement delivery device according to the one or more locations of the one or more offline merchants and the information of the one or more buyers associated with the one or more offline merchants, the one or more target users comprising one or more of the buyers associated with the one or more offline merchants.

15. The apparatus of claim 14, wherein determining the one or more target users around an advertisement delivery device according to the locations of the one or more offline merchants and the information of the one or more buyers associated with the one or more offline merchants comprises:

calculating a distance between one of the one or more offline merchants and the advertisement delivery device based on the location of the offline merchant and the location of the advertisement delivery device; and in response to determining that the distance between the offline merchant and the advertisement delivery device is smaller than a threshold, determining that the one or more buyers associated with the offline merchant are one or more target users belonging to the target group around the advertisement delivery device.

16. The apparatus of claim 13, wherein obtaining, from the payment system, the location information of the plurality of users comprises:

obtaining, from the payment system, location based service (LBS) positioning information of the plurality of users; and wherein determining the target group of target users around the advertisement delivery device comprises:

determining one or more target users around the advertisement delivery device according to the location based service (LBS) positioning information of the plurality of users.

17. The apparatus of claim 16, wherein determining the one or more target users around the advertisement delivery device according to the location based service (LBS) positioning information of the plurality of users comprises:

calculating a distance between one of the plurality of users and the advertisement delivery device based on the LBS positioning information of the user and a location of the advertisement delivery device; and in response to determining that the distance between the user and the advertisement delivery device is smaller than a threshold, determining that the user is a target user belonging to the target group around the advertisement delivery device.

18. The apparatus of claim 13, wherein before determining profile data of the target group, the operations further comprise:

obtaining, from the payment system, descriptive information of the target users in the target group; and wherein determining profile data of the target group comprises:

determining profile data of the target group based on the descriptive information of the target users in the target group.

19. One or more non-transitory computer-readable storage media comprising:

a first non-transitory computer-readable storage medium configured with instructions executable by one or more processors of a payment system to cause the one or more processors of the payment system to perform operations comprising:

collecting location information of a plurality of users from terminal devices of the plurality of users;

activating a payment function in the payment system for one or more offline merchants; and collecting transaction information of one or more offline transactions between the one or more offline merchants and one or more buyers;

a second non-transitory computer-readable storage medium configured with instructions executable by one or more processors of an advertisement delivery device to cause the one or more processors of the advertisement delivery device to perform operations comprising:

collecting real-time sensing data using one or more sensing devices of the advertisement delivery device, wherein the one or more sensing devices include an iBeacon device; and a third non-transitory computer-readable storage medium configured with instructions executable by one or more processors of a delivery terminal to cause the one or more processors of the delivery terminal to perform operations comprising:

obtaining, from a payment system, the location information of the plurality of users;

obtaining, from the payment system, the transaction information;

determining a target group of target users around the advertisement delivery device according to the location information of the plurality of users, a location of the advertisement delivery device, and the transaction information of the one or more offline merchants;

determining profile data of the target group around the advertisement delivery device;

determining user flow data of the advertisement delivery device based on the real-time sensing data collected by the one or more sensing devices of the advertisement delivery device, the real-time sensing data comprising a number of times the target users interact with the iBeacon device using iBeacon technology; and delivering an advertisement to the advertisement delivery device based on the user flow data of the advertisement delivery device and the profile data of the target group around the advertisement delivery device.

\* \* \* \* \*